G. RICHARDS.
VARIABLE SPEED MECHANISM.
APPLICATION FILED MAY 13, 1912.
1,042,720.
Patented Oct. 29, 1912.
2 SHEETS—SHEET 1.
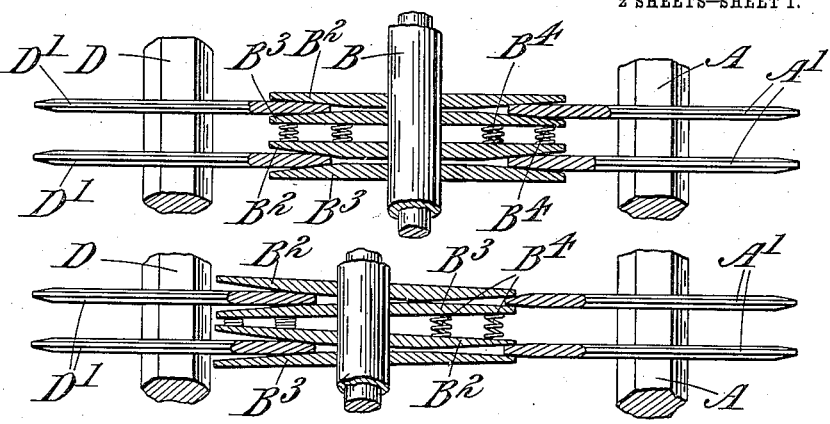
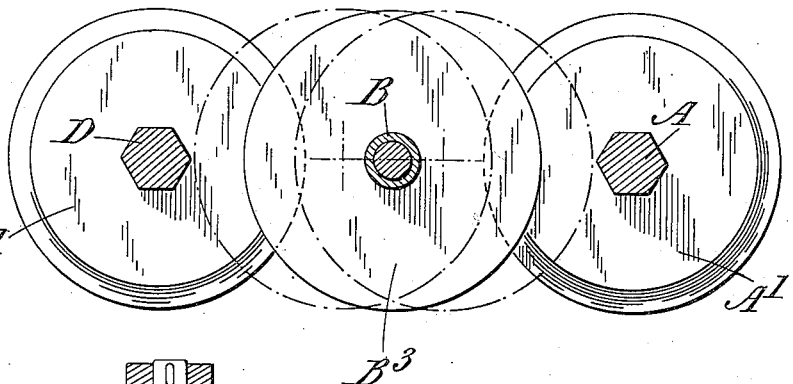
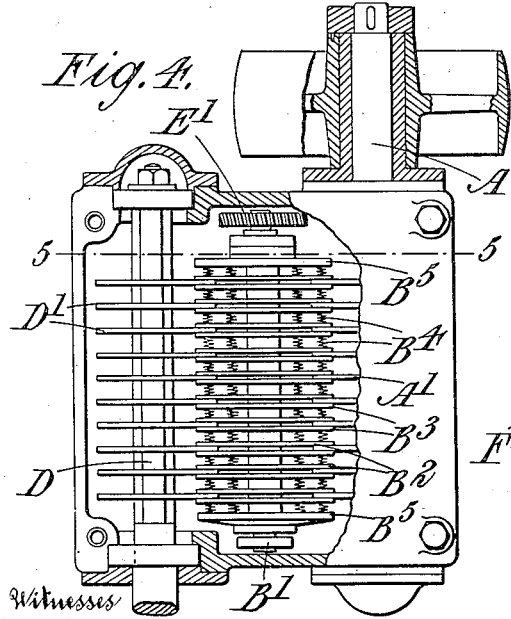
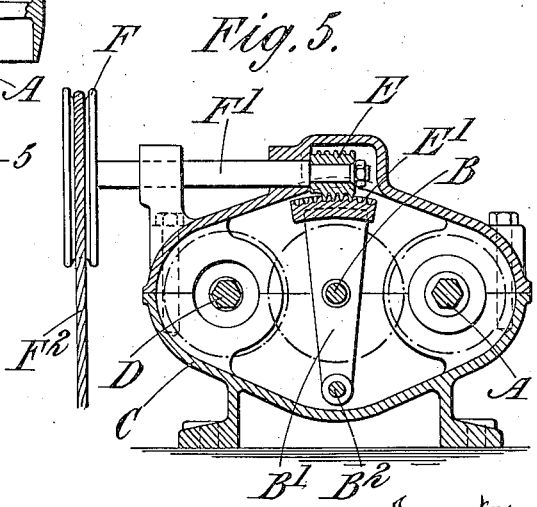
Inventor
George Richards

G. RICHARDS.
VARIABLE SPEED MECHANISM.
APPLICATION FILED MAY 13, 1912.

1,042,720.

Patented Oct. 29, 1912.

2 SHEETS—SHEET 2.

Witnesses

Inventor
George Richards

UNITED STATES PATENT OFFICE.

GEORGE RICHARDS, OF SYDENHAM, LONDON, ENGLAND.

VARIABLE-SPEED MECHANISM.

1,042,720.

Specification of Letters Patent.

Patented Oct. 29, 1912.

Application filed May 13, 1912. Serial No. 696,940.

*To all whom it may concern:*

Be it known that I, GEORGE RICHARDS, a citizen of the United States of America, residing at Sydenham, London, England, have invented certain new and useful Improvements in Variable-Speed Mechanism, of which the following is a specification.

This invention is for improvements in or relating to variable speed mechanism of the type wherein a plurality of gripping disks are held yieldingly together, and coöperate with one or more driving disks which enter between the elements of each pair of gripping disks, the speed being varied by increasing or decreasing the depth of engagement. In such mechanisms the pair of gripping disks is usually disposed upon a shaft that is movable in a direction transverse to its axis and on each side of such shaft driving and driven shafts are disposed carrying driving and driven disks which enter between the elements of the pair of gripping disks. Thus by moving the central shaft to one side or the other, the driving disk on one shaft may be made to enter more deeply between the gripping disks, while the driven disk is correspondingly withdrawn and the speed is varied accordingly.

The object of the present invention is to provide a better yielding-control for the gripping disks than that usually employed, such usual control taking the form of spiral springs placed around the shaft carrying the gripping disks.

The use of spiral springs applied at the center of the disks is found in practice to be only suitable for transmitting comparatively small powers and the object of the present invention is to provide a device that will transmit considerable horse-power which necessitates a different arrangement of spring-control and the employment of a plurality of pairs of gripping disks instead of only one such as has heretofore been employed.

Figure 6:
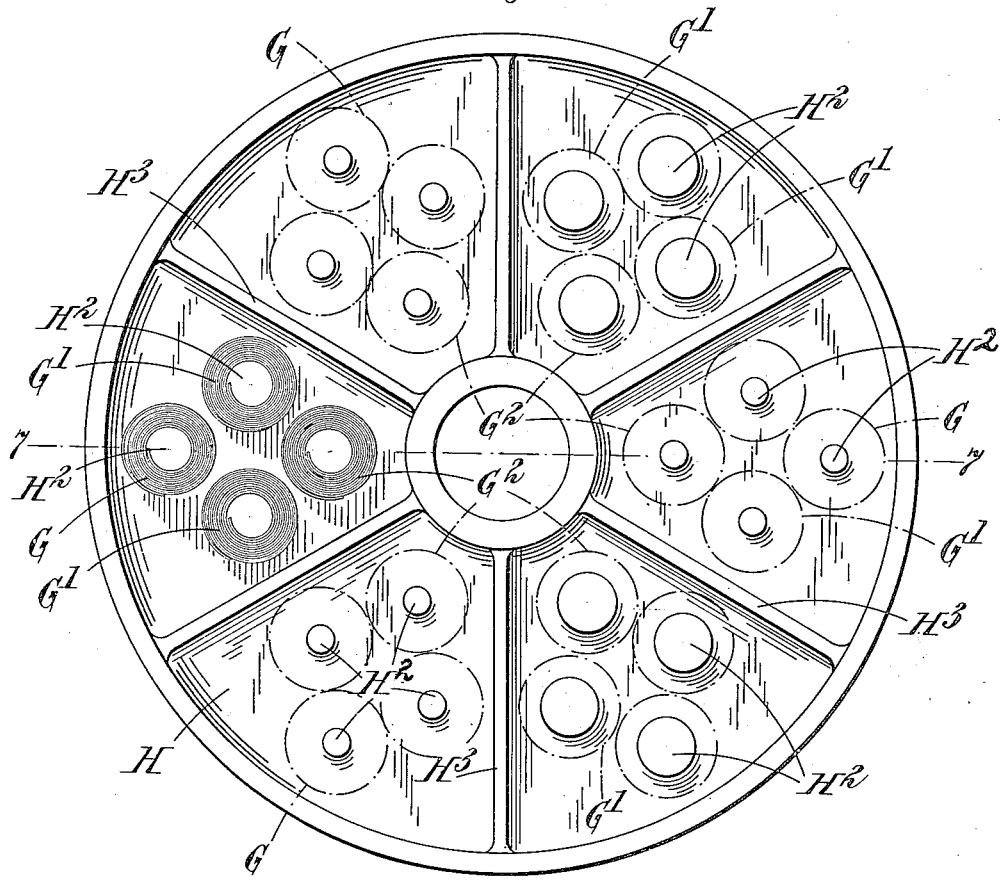
Figure 7:
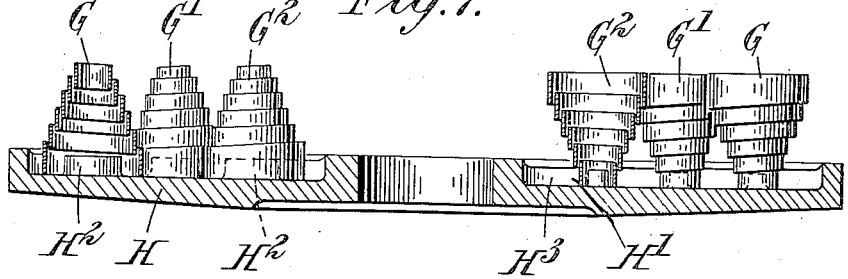

In the accompanying drawings:—Figure 1 shows diagrammatically a section through two sets of gripping disks and coöperating driving and driven disks constructed according to one method of carrying out this invention; Fig. 2 shows the same parts in a different position; Fig. 3 is an elevation of the parts shown in Fig. 1; Fig. 4 is a plan showing diagrammatically the arrangement of a complete mechanism according to the present invention; Fig. 5 is a section of Fig. 4 on the line 5—5; Fig. 6 is a plan of a modified form of gripping disk which also falls within the scope of the invention; and Fig. 7 is a section through the same showing a special arrangement of the springs relatively thereto.

Like letters indicate like parts throughout the drawings.

The driving shaft A is preferably hexagonal and has fast upon it a series of beveled driving disks $A^1$. A transmission shaft B is mounted in swinging arms $B^1$ pivoted at $B^2$ to the casing C of the mechanism. Mounted loose on the shaft B is a series of pairs of gripping disks whereof the elements of each pair are designated as $B^2$, $B^3$ respectively. These disks are beveled on their inner faces, that is the faces which are toward each other in each pair, and between the outer elements of adjacent pairs of springs $B^4$ are mounted. At the ends of the shaft B disks $B^5$ are provided which take the thrust of the springs of the outer elements of the last pairs of disks. These springs are mounted eccentric to the shaft and conveniently are near to the peripheries of the gripping disks. On that side of the shaft B remote from the shaft A is a driven shaft D. This conveniently is hexagonal and has mounted fast upon it beveled driven disks $D^1$. The disks $A^1$, $D^1$ are so spaced that they lie opposite and enter between the elements of the pairs of gripping disks so that power is transmitted from the shaft A to the disks $B^2$, $B^3$ by the frictional engagement of the disks $A^1$ therewith and thence to the shaft D by the frictional engagement of the disks $B^2$, $B^3$ with the disks $D^1$.

When the shaft B is in the position shown in Fig. 1 so that the disks $A^1$ and $D^1$ enter equal depths in between the disks $B^2$, $B^3$, the speed of the shaft D is equal to that of the shaft A, but if the shaft B is moved to the left as shown in Fig. 2, the speed of the shaft D will be less than that of the shaft A as the disks $A^1$ now engage the outer peripheries of the disks $B^2$, $B^3$, whereas the disks $D^1$ are in deep engagement with the gripping disks. The movement of the shaft B is easily effected by the swinging arms $B^1$ which may be controlled in any convenient manner, for instance by a worm E engaging a toothed sector $E^1$ on one of the arms and rotated by a pulley F on a spindle $F^1$ whereon the worm E is mounted, the pulley being driven by a rope F² to which power may be applied in any desired manner.

It will be seen that the springs B⁴ being near the peripheries of the gripping disks, can be made to give any required pressure at the edges according to the number of springs employed and the strength of the same, and yet will readily yield to permit the splaying of the gripping disks on one side during rotation when the shaft B is out of the central position, as shown in Fig. 2; an easy and steady drive can thus be obtained throughout the mechanism for all speeds, and considerable power can be transmitted as every additional pair of gripping members which is added with its coöperating parts increases the transmission power of the mechanism. A still better effect, however, is obtained by using the special construction and arrangement of springs shown in Figs. 6 and 7, wherein the strength of the springs is graded so that those nearest the center are stronger than those toward the periphery. For instance, the spring G may be pressed flat at say a pressure of five pounds, the spring G¹ at ten pounds, and the spring G² at twenty pounds. These degrees of strength are of course only given by way of example as they can obviously be varied according to requirements. It is further found in practice that the only satisfactory form of spring is one of the volute type as is shown in Figs. 6 and 7 as this is less likely to break than an ordinary spiral spring which it is difficult to get to stand the rapid compression and expansion due to running at high speed; moreover, the volute spring can be accommodated in a smaller space. The question of space is also an important one as otherwise a large number of pairs of gripping disks becomes unwieldy. For this purpose the gripping disks H (Figs. 6 and 7) are made hollowed or dished at H¹ and projections H² are cast on them to carry the springs. The disks may be strengthened by webs H³ and conveniently four springs are disposed between each pair of webs. In the drawings the projections H² in alternate sections of the disk as divided up by the webs, are shown to be small as compared with those in the other sections, this arrangement being intended to permit the volute springs in one section to have their small ends bearing against the disk on the small studs and in the others to have their large ends against the disk.

It will be seen that by grading the springs so that the strongest ones are nearest the center, all the springs are made to do their proper amount of work. If all the springs were of the same strength, the resistance offered by one near the center would be small as compared with one near the periphery when the plate was so tilted by splaying the elements of the pair that the one near the periphery was collapsed say to half its original length, as the one near the center would be collapsed much less; whereas by grading the springs the one near the center, which we will suppose is collapsed one-eighth of an inch, may be made to offer the same degree of resistance as the one at the outer periphery, which we will suppose is collapsed half an inch, so that all the springs are doing their proper amount of work and enable the gripping members to maintain a proper hold upon the driving and driven members.

What I claim as my invention and desire to secure by Letters Patent is:—

1. In a variable speed mechanism, the combination of a transmission shaft, a pair of gripping disks thereon, a plurality of springs of different strengths engaging said gripping disks at different distances from the center of the latter, said springs decreasing in strength as their distance from the disks' centers increases, a drive disk engaging between said gripping disks, a driven disk engaging between said gripping disks, and means for varying the extent of such engagement between said several disks.

2. In a variable speed mechanism, the combination of a transmission shaft, a pair of gripping disks thereon, a plurality of springs of different strengths engaging said gripping disks at different distances from the center of the latter for yieldingly maintaining said disks in engagement, said springs decreasing in strength as their distance from the disks' centers increases, a drive disk extending between said gripping disks, a driven disk extending between said gripping disks, and means for shifting said transmission shaft relative to said drive and driven disks.

In testimony whereof I have signed my name to this specification in the presence of two subscribing witnesses.

GEORGE RICHARDS.

Witnesses:
  A. M. HAYWARD,
  HARRY S. SPIDGE.